No. 717,080. Patented Dec. 30, 1902.
G. D. COLEMAN.
METALLIC SURFACE SHEATHING.
(Application filed Jan. 9, 1901.)
(No Model.)

Witnesses:
John F. C. Printler
Horace Van Evera

Inventor:
George D. Coleman
by his Attorney
Benjamin Phillips

UNITED STATES PATENT OFFICE.

GEORGE D. COLEMAN, OF BOSTON, MASSACHUSETTS, ASSIGNOR TO THE COLEMAN SHIP AND PILE COPPERING COMPANY, OF EAST ORANGE, NEW JERSEY, AND BOSTON, MASSACHUSETTS, A CORPORATION OF NEW JERSEY.

METALLIC SURFACE SHEATHING.

SPECIFICATION forming part of Letters Patent No. 717,080, dated December 30, 1902.

Application filed January 9, 1901. Serial No. 42,601. (No model.)

*To all whom it may concern:*

Be it known that I, GEORGE D. COLEMAN, a citizen of the United States, residing at Boston, in the county of Suffolk and State of Massachusetts, have invented certain new and useful Improvements in Metallic Surface Sheathing; and I do hereby declare the following to be a full, clear, and exact description of the invention, such as will enable others skilled in the art to which it appertains to make and use the same.

The present invention relates to an improvement in metallic surface sheathing.

In my application, Serial No. 40,544, I described and claimed a metallic surface sheathing consisting of a continuous sheathing of metal attached to the surface to be protected by a binding-layer of adhesive substance. The specific form of sheathing described in that application, in which a red lead and oil paint is used as the adhesive substance, is not adapted to protect surfaces exposed to liquids, gases, or vapors at high temperature, because the heat would oxidize the oils of the paint and tend to impair or diminish its adhesive qualities.

The object of the present invention it to produce a metallic surface sheathing which will resist high temperatures and adequately protect the surfaces to be covered from corrosion or the pollution or adulteration of the liquids, gases, or vapors exposed thereto.

While my invention is susceptible of being used in any place or upon any surface or structure exposed to the corroding action of liquid gases or vapors or the pollution or adulteration of such things by the deterioration of the surface or structure, is especially useful for the lining of dye-vats and equally whether they be old or new. As at present constructed new dye-vats are usually made of sheet iron or steel and provided with a lining of sheet-lead, which in the course of time wears away, leaving the iron to be corroded by the liquors. Of course after the lead lining has worn through the vats cannot be used for the more delicate dyes, but the first cost is so great that they are used until the sheet iron or steel is almost or quite corroded through and then they are replaced. By use of my improved metallic surface sheathing after the lead lining of such dye-vats is worn through a new lining may be provided in its place and the same may be replaced indefinitely.

Figure 1:
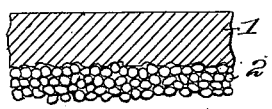
Figure 2:
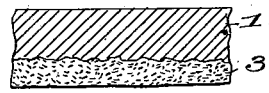
Figure 3:
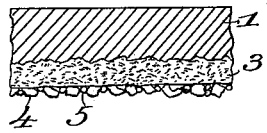
Figure 4:
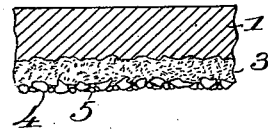
Figure 5:
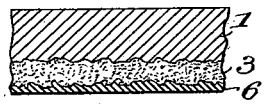

In the accompanying drawings, illustrating the preferred form of my invention and a method of making the same, Figures 1, 2, 3, and 4 illustrate diagrammatically the sheathing at different stages in its process of making, and Fig. 5 illustrates diagrammatically the completed sheathing.

My invention consists of a continuous metallic layer mechanically secured to the surface to be protected by a metallic binding-layer. (See Fig. 5.) The outer layer of the sheathing may be of any metal or alloy suitable for the particular use to which it is to be put or any combinations of metals and alloys—such as lead and solder, copper and solder, or silver and solder. The outer layer will preferably consist of small pieces of metal or alloy united in a continuous sheet by soldering; but it is not limited to any particular form of surface layer, nor where such small pieces of metal or alloy are soldered into a continuous metallic layer is my invention limited to the use of any particular kind of solder, as any metal or alloy capable of acting as a solder for the metal or alloy of the outer layer may be employed. The metallic binding-layer for uniting the outer layer to the surface to be covered may be any suitable metal or alloy. I prefer to use lead, as it is soft, easily brought to the desired shape, and is easily penetrated by the small pieces of metal or alloy comprising the outer layer.

The preferred method of making my improved metallic surface sheathing is as follows: The surface 1 to be covered, if it is not already rough and uneven, as a corroded piece of iron would be, is first roughened in any desired manner, such as by treating it with acid or heat or by mechanically-roughening process in order to afford irregularities and unevenness for the binding-layer to take hold of. I then apply to the surface a coating of comminuted lead 2, the particles of which have been covered with a slight amount of paint in order to afford a temporary binder to hold the particles of lead in position until the subsequent processes are accomplished. (See Fig. 1.) This layer of comminuted lead is lightly rolled or hammered while the paint is yet moist in order to press the particles of the mass into close contact with each other. The layer is allowed to become thoroughly dry, and then it is subjected to a severe hammering process, by means of which the particles of lead are firmly united together into a binding-layer 3 and attached to the surface to be covered. (See Fig. 2.) The presence of the small quantity of paint I have found to be no impediment to this process. I then spread upon the surface a very thin layer of paint and apply to it a layer 4 of the comminuted metal or alloy of which the outer layer is to be composed, which adheres to the paint and is temporarily supported thereby. Then I apply still more finely-divided solder 5, which adheres to the paint in the interstices between the larger particles of metal or alloy. (See Fig. 3.) This paint, with its layers of comminuted metal or alloy and solder, is allowed to become thoroughly dry, and then I hammer the particles of metal or alloy and solder into the binding-layer of lead. (See Fig. 4.) Any suitable paint may be employed for this purpose which has a viscosity and adhesiveness sufficient to support the metal particles in place and which will not be so decomposed by the subsequent heating step of the process as to destroy the integrity of the structure. Thus the particles of metal or alloy are securely and mechanically united to the binding-layer. Then after coating the surface with soldering fluid I go over the entire surface with a hot soldering-iron, which melts the solder and solders all the particles of metal or alloy into a continuous metallic sheet, which is firmly and mechanically bound to the surface to be covered by the metallic binding-layer. (See Fig. 5.)

It is to be noted that my invention is not limited to any particular method of making my improved metallic sheathing, as the method of making the same does not comprise any part of my invention. It is also to be noted that while I have illustrated and described the preferred form of metallic surface sheathing embodying my invention my invention is not limited thereto, as any form of sheathing having a continous surface of metal or alloy mechanically united to a surface to be covered by a metallic binding-layer is within the purview of my invention.

It will be observed that my improved metallic surface sheathing is provided with a surface of metal which is so intimately connected with the supporting structure that heat applied to the outer layer will be quickly conducted to the structure, whereby the inequalities of expansion due to the varying temperatures of the parts will be as small as possible, and, furthermore, that the sheathing is so strongly united to the supporting structure that it will not be separated therefrom by the sudden application of heat to its outer surface and the consequent unequal expansion of the outer layer and that the heat-conductive binding-layer materially contributes to obviate this danger.

I am aware that it has been proposed to galvanize iron by first applying a coating of copper or tin or tin and lead and then a coating of zinc by dipping in the molten metals; that it has been proposed to copper iron by first applying a coating of zinc and then a coating of copper by dipping in the molten metals; that it has been proposed to tin or copper the iron by the use of powdered chlorid of zinc, borax, or other suitable flux and metallic tin-foil or granulated copper and the application of sufficient heat to melt the tin or copper and heat the iron to redness, so as to fuse the covering metal to the iron, and that it has been proposed to copper iron by the successive electrodeposition of copper and the smoothing of the outer surface thereof. All such processes, however, result in a sheathing entirely different from mine. First, all but the last of these processes produce a sheathing which is fused to the metal to be covered. According to my invention the sheathing is mechanically united to the metal. Second, all but the last of these processes require the melting of the metallic coating or the heating of the whole of the metal to be coated. According to my invention the heat is locally applied and all the metallic coating is never melted at one time and the metal to be coated is never substantially heated at all. Third, the last process requires electroplating-baths and electricity. Fourth, all of the processes contemplate the fusing or electrodeposition of the metal coating or one of its layers directly upon the metal to be covered.

My invention contemplates the use of an intermediate metallic layer between the metal to be covered and the outer layer, which mechanically unites the two together. It will be apparent to those skilled in the art that my sheathing can be employed in many places where the coatings of the prior art could not be used, because of the necessary steps in the production of those coatings which would forbid their employment. My sheathing is preferable to all these prior schemes by reason of its ease of application to the metal to be covered in place, besides by reason of other advantages obvious to those skilled in the art.

Having thus described my invention, I claim as new and desire to secure by Letters Patent of the United States—

1. The metallic surface sheathing consisting of an outer layer of comminuted metal or alloy, the particles of which are united together, and a binding-layer of soft metal or alloy mechanically attached to the surface to be covered and mechanically attached to the layer of comminuted metal or alloy, substantially as described.

2. The metallic surface sheathing consisting of an outer layer of comminuted metal or alloy, the particles of which are united by being soldered together, and a binding-layer of soft metal, particles of the outer layer penetrating the binding-layer and mechanically uniting the outer layer firmly to the binding-layer, substantially as described.

3. The continuous metallic surface sheathing consisting of an outer layer of comminuted metal or alloy, and a binding-layer of comminuted soft metal or alloy mechanically uniting the outer layer firmly to the surface to be covered, substantially as described.

4. The metallic surface sheathing consisting of an outer layer of comminuted metal or alloy united into a continuous metallic sheet, having particles thereof extended beyond the general level of the inner surface, and a binding-layer of comminuted soft metal or alloy mechanically united to the surface to be covered and mechanically united to the outer layer receiving the projecting particles of the outer layer and securely holding said outer layer thereby, substantially as described.

In testimony whereof I affix my signature in presence of two witnesses.

GEORGE D. COLEMAN.

Witnesses:
ALFRED H. HILDRETH,
BENJAMIN PHILLIPS.